Sept. 25, 1956           A. BLUMSTEIN          2,763,981
BEAD CHAIN WITH SUPPORTED LOOP CONNECTING
LINKS AND METHOD OF MAKING SAME
Filed Sept. 28, 1954

INVENTOR
Abraham Blumstein
BY
ATTORNEY

United States Patent Office 2,763,981
Patented Sept. 25, 1956

2,763,981

BEAD CHAIN WITH SUPPORTED LOOP CONNECTING LINKS AND METHOD OF MAKING SAME

Abraham Blumstein, Forest Hills, N. Y.

Application September 28, 1954, Serial No. 458,835

8 Claims. (Cl. 59—82)

This invention relates to the stringing of beads to form bracelets, necklaces, chaplets, rosaries, and the like and, more particularly, to a novel chain link frictionally lockable in a hole in a preformed bead and having loops at either end interlinking with similar links.

Strings of beads, frequently pearls, are used, for example, in expensive watch bands where the string or chain must stand considerable tension. Fabric threads, such as cotton and "nylon" threads, used to form such strings by knotting the thread between beads, have not been satisfactory when, for example, the strung beads are used in watch bands. Another expedient, which is unsatisfactory for watch bands or where tension is applied to the strung beads, is to use a wire thread such as silver or gold wire, knotted between beads and frequently soldered to the beads within the holes therein.

The only satisfactory stringing arrangement, where tension is applied to the string, is to use wire links forming a chain on which the beads are anchored. Loops at the end of each link are interconnected to loops of adjacent links to form the chain. However, this arrangement, although satisfactory in use, has disadvantages due to the difficulty and cost of assembly. In order to withstand the tension applied, the links have had to be anchored to the beads, as by embedding bent ends in a bead molded around the links, or soldering the link ends together. An open-ended or noncontinuous link has not been satisfactory in use.

The present invention is directed to a novel link insertable through an opening or passage in a bead and positively frictionally locked in the bead by virtue of its configuration and of its manipulation in assembling it with a bead and with adjacent similar links.

The invention link comprises a wire or relatively narrow substantially flat strip of flexible and resilient metal bent into substantially a narrow, elongated V. The outer end of one leg of the V is bent arcuately outward about a radius substantially equal to that of the curved surface of the bead to be anchored to the clip. The opposite leg of the V has an elongated extension which is bent outwardly somewhat and then inwardly to extend across the open end of the V toward the first leg but having its end spaced outwardly away from the curved extended end of the latter. The clip may be formed of a precious metal or may be plated therewith.

The clip is arranged to be inserted through a hole pierced or otherwise formed through a bead and having a diameter slightly greater than twice the thickness of the legs of the V. In assembling the clip to the bead, the V is compressed and then inserted, apex end first, partway through the hole in the bead. The elongated extension of one leg is then bent toward the V apex so that it lies between the two legs, after which the clip is forced further through the hole until the apex end of the V extends beyond the bead and the arcuate leg extension lies against the bead surface.

The apex end is then expanded somewhat to form a small loop for receiving the elongated extension on the next link. Before the above described assembly, the link, if it is to be an intermediate link of a chain, has its elongated extension inserted through the apex loop of an adjacent link already assembled with a bead.

Due to the expanded apex loop and the triple metal thickness in the bead hole adjacent the initially open end of the link, the assembled link is firmly anchored in the bead without soldering and without having bent ends embedded in the bead.

For an understanding of the invention principles, reference is made to the following description of a typical embodiment thereof as illustrated in the accompanying drawings. In the drawings.

Figure 1:
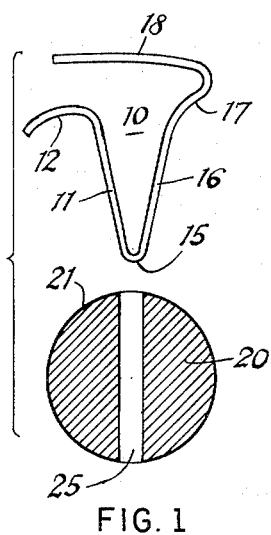
Fig. 1 is a view showing the invention link aligned for assembly with a bead, the link being shown in side elevation and the bead in section.

Referring to the drawing, the link 10 is substantially an elongated narrow V in elevation, having diverging legs 11 and 16 extending from an apex 15. The link is formed of flexible and resilient metal, and may, for example, be of a precious metal or plated therewith. Leg 11 has its outer end arcuately curved outwardly, as at 12, a radius substantially equal to that of the surface 21 of a bead 20 to which link 10 is to be assembled. The outer end of leg 16 is bent somewhat outwardly, as at 17, and then inwardly to form an elongated extension 18 extending across the open end of the V and having its end spaced outwardly of arcuate end 12 of leg 11.

Figure 2:
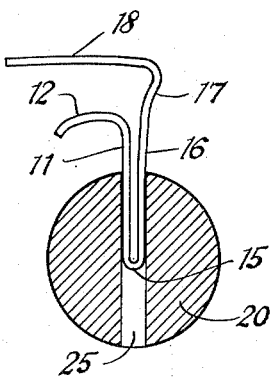
Figs. 2 and 3 are sectional views illustrating successive steps in assembling the link in the bead.
Figure 3:
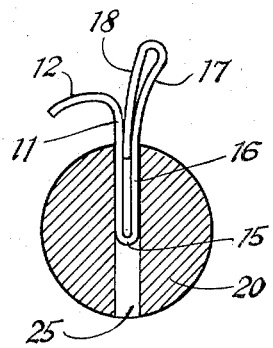

Link 10 is adapted to be anchored in a passage or aperture 25 extending through bead 20. To insert link 10, legs 11 and 16 are pressed into engagement, apex 15 is inserted into passage 25, and the link is forced partly through the aperture, as shown in Fig. 2. At this point, extension 18 is bent toward apex 15 to lie between legs 11 and 16, as shown in Fig. 3. Before this, if link 10 is an intermediate link, end 18 will have been inserted through the apex loop of a preceding link.

Figure 4:
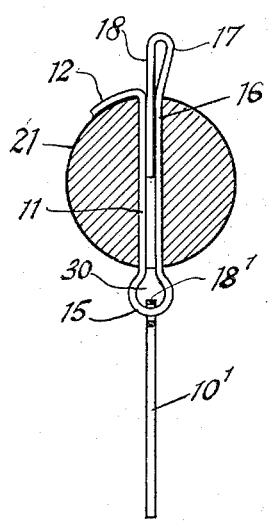
Fig. 4 is a sectional view of the assembled bead and link, showing an adjacent link engaged in the apex loop.
Figure 5:
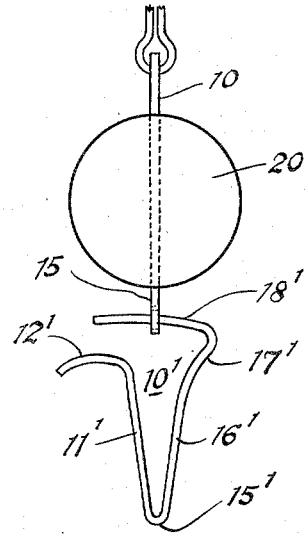
Fig. 5 is an elevation view at right angles to Fig. 4.

Link 10 is then forced the rest of the way through passage 25 so that apex 15 projects therebeyond, as shown in Figs. 4 and 5, with end 12 of link 11 lying against bead surface 21. Apex 15 is then expanded to form a loop 30 receiving the extension 18' of a succeeding link 10'.

Passage 25 is slightly larger than the combined thickness of legs 11 and 16. Consequently, the insertion of extension 18 between these legs followed by further movement of the link into the passage firmly wedges link 10 in passage 25 against continued movement therethrough. Retrogression of the link along passage 25 is prevented by the expansion of apex 15 to form loop 30.

The arrangement thus provides an open-ended link construction which is firmly anchored in the bead without soldering and without embedding bent ends in the bead. The assembly of the link with the bead, and of a string of beads, is quick, economical, and simple.

While a specific embodiment of the invention has been shown and described in detail to illustrate the application of the invention principles, it will be understood that the invention may be embodied otherwise without departing from such principles.

What is claimed is:

1. A link blank arranged to be anchored in an apertured bead to connect the bead in a string of similar beads, said link comprising a length of flexible and resilient material bent to form a relatively narrow and elongated V having a pair of legs diverging from an apex;

one of said legs having an elongated extension from its outer end bent outwardly away from the other leg and then bent inwardly at a sharp angle across the outer end of the other leg; said other leg having an extension from its outer end bent outwardly away from such one leg and reentrantly curved to conformingly engage the bead surface when the link blank is inserted in the aperture of a bead; the portions of the legs between the respective extensions and the apex of the V being substantially equal in length.

2. In combination, an apertured bead; and a link extending through the bead aperture and comprising a length of flexible and resilient metal bent to form a pair of legs extending from a loop-forming bight outside the bead, the legs being substantially juxtaposed for part of the distance through the aperture; one leg having an extension on its outer end bent inwardly to form a second loop-outside the bead opposite said bight, and said extension being wedged between said legs for the rest of the distance through the aperture.

3. In combination, an apertured bead; a link extending through the bead aperture and comprising a length of flexible and resilient metal bent to form a pair of legs extending from a loop-forming bight outside the bead, the legs being substantially juxtaposed for part of the distance through the aperture; one leg having an extension on its outer end bent inwardly to form a second loop-outside the bead opposite said bight, and said extension being wedged between said legs for the rest of the distance through the aperture; and a second substantially identical link having its said bight interlinked with said loop of the first link.

4. In combination, an apertured bead; and a link extending through the bead aperture and comprising a length of flexible and resilient metal bent to form a pair of legs extending from a loop-forming bight outside the bead, the legs being substantially juxtaposed for part of the distance through the aperture; one leg having an extension on its outer end bent inwardly to form a second loop-outside the bead opposite said bight, and said extension being wedged between said legs for the rest of the distance through the aperture; the other leg having an outwardly bent curved extension conformingly engaging the bead outer surface.

5. In combination, an apertured bead; a link extending through the bead aperture and comprising a length of flexible and resilient metal bent to form a pair of legs extending from a loop-forming bight outside the bead, the legs being substantially juxtaposed for part of the distance through the aperture; one leg having an extension on its outer end bent inwardly to form a second loop-outside the bead opposite said bight, and said extension being wedged between said legs for the rest of the distance through the aperture; the other leg having an outwardly bent curved extension conformingly engaging the bead outer surface; and a second substantially identical link having its said bight interlinked with said loop of the first link.

6. A method of assembling a connection link to an apertured bead comprising bending a length of flexible and resilient metal to form a relatively elongated V having a pair of legs diverging from an apex with one leg having an extension from its outer end extending across the open end of the V in spaced relation to the outer end of the other leg, and the other leg having an outwardly bent curved extension arranged to conformingly engage the bead outer surface; inserting said V, apex end first into the bead aperture; bending the extension on said one leg inwardly into the space between the legs; and further inserting said V through the aperture to project said apex therebeyond, to engage said curved extension with the outer surface of the bead, and to move said inwardly bent extension into the bead aperture.

7. A method of assembling a connection link to an apertured bead comprising bending a length of flexible and resilient metal to form a relatively elongated V having a pair of legs diverging from an apex with one leg having an extension from its outer end extending across the open end of the V in spaced relation to the outer end of the other leg, and the other leg having an outwardly bent curved extension arranged to conformingly engage the bead outer surface; inserting said V, apex end first into the bead aperture; bending the extension on said one leg inwardly into the space between the legs; further inserting said V through the aperture to project said apex therebeyond, to engage said curved extension with the outer surface of the bead, and to move said inwardly bent extension into the bead aperture; and enlarging said apex to form a loop.

8. A method of assembling a connection link to an apertured bead comprising bending a length of flexible and resilient metal to form a relatively elongated V having a pair of legs diverging from an apex with one leg having an extension from its outer end extending across the open end of the V in spaced relation to the outer end of the other leg, and the other leg having an outwardly bent curved extension arranged to conformingly engage the bead outer surface; inserting said V, apex end first into the bead aperture; bending the extension on said one leg inwardly into the space between the legs; further inserting said V through the aperture to project said apex therebeyond, to engage said curved extension with the outer surface of the bead, and to move said inwardly bent extension into the bead aperture; enlarging said apex to form a loop; and enlarging the bight of said one leg and its extension to form a second loop.

References Cited in the file of this patent

UNITED STATES PATENTS

| | | |
|---|---|---|
| 686,464 | Lovell | Nov. 12, 1901 |
| 955,129 | Brown | Apr. 19, 1910 |

FOREIGN PATENTS

| | | |
|---|---|---|
| 333,410 | France | June 26, 1903 |
| 474,374 | France | Feb. 18, 1915 |
| 614,761 | France | Dec. 22, 1926 |
| 635,045 | France | Mar. 5, 1928 |